United States Patent
Hugues et al.

(10) Patent No.: US 9,376,273 B2
(45) Date of Patent: Jun. 28, 2016

(54) AUTOMATIC LOADING/UNLOADING APPARATUS FOR AUTOMATICALLY LOADING/UNLOADING FLAT ARTICLES STACKED ON EDGE, A SORTING MACHINE FOR SORTING FLAT ARTICLES, AN UNLOADING METHOD, AND A POSTAL SORTING METHOD

(71) Applicant: SOLYSTIC, Gentilly (FR)

(72) Inventors: Damien Hugues, Bourg les Valence (FR); Pierre Campagnolle, Allex (FR); Marie Petit, Valence (FR)

(73) Assignee: SOLYSTIC, Gentilly (FR)

( * ) Notice: Subject to any disclaimer, the term of this patent is extended or adjusted under 35 U.S.C. 154(b) by 110 days.

(21) Appl. No.: 13/805,925

(22) PCT Filed: Oct. 12, 2012

(86) PCT No.: PCT/FR2012/052335
§ 371 (c)(1),
(2) Date: Dec. 20, 2012

(87) PCT Pub. No.: WO2013/093252
PCT Pub. Date: Jun. 27, 2013

(65) Prior Publication Data
US 2014/0110315 A1    Apr. 24, 2014

(30) Foreign Application Priority Data
Dec. 22, 2011   (FR) ...................................... 11 62316

(51) Int. Cl.
*B07C 5/36* (2006.01)
*B65G 65/00* (2006.01)
(Continued)

(52) U.S. Cl.
CPC .............. *B65G 65/005* (2013.01); *B07C 3/008* (2013.01); *B07C 5/00* (2013.01); *B65H 1/027* (2013.01);
(Continued)

(58) Field of Classification Search
CPC ........ B65G 65/006; B07C 3/008; B07C 5/00; B65H 1/027; B65H 1/28; B65H 1/30; B65H 31/06; B65H 2301/442542; B65H 2301/442548; B65H 2301/42265; B65H 2405/211; B65H 2405/3312; B65H 2701/1916
USPC ................... 209/606, 584, 900; 414/788, 801
See application file for complete search history.

(56) References Cited

U.S. PATENT DOCUMENTS

| | | | |
|---|---|---|---|
| 7,389,983 B2 * | 6/2008 | Berdelle-Hilge et al. | .... 271/157 |
| 8,020,701 B2 * | 9/2011 | Berdelle-Hilge et al. | .... 206/425 |
| 2009/0236251 A1 * | 9/2009 | Berdelle-Hilge et al. | .... 206/425 |

FOREIGN PATENT DOCUMENTS

| | | |
|---|---|---|
| DE | 10 2006 031 121 B3 | 11/2007 |
| FR | 2 646 620 A1 | 11/1990 |

OTHER PUBLICATIONS

French Search Report of FR 1162316 dated Jul. 27, 2012.
(Continued)

*Primary Examiner* — Joseph C Rodriguez
*Assistant Examiner* — Kalyanavenkateshware Kumar
(74) *Attorney, Agent, or Firm* — Sughrue Mion, PLLC

(57) ABSTRACT

Automatic loading/unloading apparatus (1) for automatically loading flat articles (200) stacked on edge into storage trays (300) and for automatically unloading flat articles (200) stacked on edge therefrom, each of the storage trays (300) having a bottom plate (301) provided with a through window (306), said automatic loading/unloading apparatus having a stationary actuator (4) in register with said window and a moving actuator (5) that receives said storage tray (300) and that is mounted to move between:
- a waiting position in which said stationary actuator (4) is set back from said moving actuator (5) and is not in contact with said flat articles (200); and
- an unloading position in which said stationary actuator (4) passes through said window (306) while carrying said flat articles (200) until it comes flush with said stacking zone (3) suitable for receiving said flat articles (200) without said storage tray (300) being interposed between said flat articles (200) and said stacking zone (3).

14 Claims, 6 Drawing Sheets

(51) Int. Cl.
    *B07C 3/00* (2006.01)
    *B65H 31/06* (2006.01)
    *B65H 1/02* (2006.01)
    *B65H 1/28* (2006.01)
    *B65H 1/30* (2006.01)
    *B07C 5/00* (2006.01)

(52) U.S. Cl.
    CPC .. *B65H 1/28* (2013.01); *B65H 1/30* (2013.01); *B65H 31/06* (2013.01); *B65H 2301/42265* (2013.01); *B65H 2301/422542* (2013.01); *B65H 2301/422548* (2013.01); *B65H 2405/211* (2013.01); *B65H 2405/3312* (2013.01); *B65H 2701/1916* (2013.01)

(56) References Cited

OTHER PUBLICATIONS

Communication dated Feb. 17, 2015, issued by the New Zealand Intellectual Property Office for New Zealand Patent Application No. 625009.

* cited by examiner

AUTOMATIC LOADING/UNLOADING APPARATUS FOR AUTOMATICALLY LOADING/UNLOADING FLAT ARTICLES STACKED ON EDGE, A SORTING MACHINE FOR SORTING FLAT ARTICLES, AN UNLOADING METHOD, AND A POSTAL SORTING METHOD

CROSS REFERENCE TO RELATED APPLICATIONS

This application is a National Stage of International Application No. PCT/FR2012/052335 filed Oct. 12, 2012, claiming priority based on French Patent Application No. 11 62316 filed Dec. 22, 2011, the contents of all of which are incorporated herein by reference in their entirety.

TECHNICAL FIELD

The invention relates generally to automatic loading/unloading apparatus for automatically loading flat articles stacked on edge into storage trays and for automatically unloading flat articles stacked on edge therefrom, each of the storage trays having a bottom plate receiving the edges of the flat articles and provided with at least one through window, the automatic loading/unloading apparatus having at least one tray-receiving zone suitable for receiving the storage trays and a stacking zone suitable for receiving the flat articles stacked on edge in the stacking direction before loading/after unloading.

The invention relates also to a sorting machine for sorting flat articles, the sorting machine including at least one unstacker, conveyor means, and sorting outlets into which the flat articles are to be distributed in compliance with a predetermined sorting plan.

The invention relates also to a method of automatically unloading flat articles stacked on edge into/from storage trays, each of which has a bottom plate receiving the edges of the flat articles and provided with at least one through window.

The invention relates finally to a postal sorting method during which at least one of the following steps is performed: unloading flat articles stacked on edge from a storage tray; unstacking the flat articles, sorting the flat articles, stacking the flat articles, and loading the flat articles into at least one storage tray.

In the meaning of the invention, a "flat article" means, particularly but not exclusively, a mailpiece. Mailpieces that are suitable for being loaded/unloaded automatically using the apparatus of the invention may be of various sizes, and they may also have a variety of mechanical characteristics, in particular as regards stiffness. Such a mailpiece may, inter alia, be an ordinary letter, a magazine, an envelope with or without a window, a newspaper, or indeed a catalogue wrapped in plastic or in paper, with or without gussets.

PRIOR ART

In known manner, during the process of sorting the flat articles on edge, first trays containing flat articles on edge are brought to a sorting machine at which the first storage trays are unloaded. The flat articles are arranged on edge, at the inlet of the sorting machine, in the form of stacks. The flat articles are then unstacked and then sorted in compliance with a determined sorting plan, and distributed among sorting outlets at which they are stacked on edge depending on their destinations. Then, the sorted stacks of flat articles are retrieved manually by an operator and placed in second storage trays. In particular when the flat articles are stacked on edge, the storage tray unloading and loading operations need to be performed manually, thereby making the sorting process more complex, making it less reliable, and limiting its efficiency. In addition, using storage trays that are different from one another requires complicated management of the flows of traffic of the storage trays, large storage capacities for storing storage trays, and use of units that have low cost-effectiveness for transferring flat articles between trays.

SUMMARY OF THE INVENTION

An object of the invention is to remedy those drawbacks by proposing automatic loading/unloading apparatus that enables flat articles stacked on edge to be loaded automatically into storage trays and to be unloaded automatically therefrom, and by proposing a method of automatically unloading flat articles stacked on edge that enables the efficiency of processing of the flat articles to be improved while also preserving the structural integrity of the flat articles and while using a single type of storage tray making it possible to facilitate managing the storage trays.

To this end, the invention provides automatic loading/unloading apparatus for automatically loading flat articles stacked on edge into storage trays and for automatically unloading flat articles stacked on edge therefrom, each of the storage trays having a bottom plate receiving the edges of the flat articles and provided with at least one through window, the automatic loading/unloading apparatus having at least one tray-receiving zone suitable for receiving the storage trays successively and at least one stacking zone suitable for receiving the flat articles stacked on edge in the stacking direction before loading/after unloading, said automatic loading/unloading apparatus being characterized in that it has at least one stationary actuator and at least one moving actuator, which actuators are designed so that, simultaneously, one of them is in register with the window and the other of them receives the storage tray bearing against it, and so that the actuators are movable relative to each other between:

a waiting position in which the stationary actuator or the moving actuator that is in register with the window is set back from the moving actuator or from the stationary actuator so that the storage tray can rest respectively on the moving actuator or on the stationary actuator without respectively the stationary actuator or the moving actuator being in contact with the flat articles; and an unloading position in which respectively the moving actuator or the stationary actuator is set back from the stationary actuator or from the moving actuator so that the stationary actuator or the moving actuator can pass through the window while carrying the flat articles to be loaded/unloaded until it comes flush with the stacking zone without the storage tray being interposed between the flat articles and the stacking zone.

The basic idea of the invention is to provide two actuators, namely a moving actuator and a stationary actuator, one of the actuators being suitable for passing through the storage tray to move the flat articles relative to the tray while serving as a bearing surface for them so as to extract them from the storage tray, so that it is possible, using the same storage tray, both to load said tray automatically and also to unload it automatically.

The automatic loading/unloading apparatus of the invention may advantageously have the following features:

it may have adjustment means arranged to adapt the length of the stacking zone, in the stacking direction, between a maximum length and a minimum length corresponding to the length of the stack of flat articles that it receives;

it may have at least one shuttle carrying the stationary actuator and the moving actuator and defining the tray-receiving zone, the shuttle being mounted to move in the stacking direction, so that the tray-receiving zone remains adjacent to the stacking zone regardless of the length of the stacking zone, the shuttle thus being mounted to move between an upstream position corresponding to the stacking zone having a maximum length and a downstream position corresponding to the stacking zone having a minimum length;

it may have at least one main belt of the endless type, guided by pulleys including at least one high intermediate pulley and at least one low intermediate pulley that are carried by the shuttle, and a high downstream pulley, a low downstream pulley, and an upstream pulley that are carried in stationary manner and that are provided on either side of the shuttle, the working run of the belt extending between the high intermediate pulley and the high downstream pulley and defining the stacking zone, and the shuttle moving in translation simultaneously causing the length of the stacking zone to vary, and causing the tray-receiving zone to be kept adjacent to the stacking zone;

between the upstream pulley and the low intermediate pulley, the main belt defines an opposite run that is substantially parallel to the working run so that the variation in the length of the stacking zone while the shuttle is moving does not have any impact on the total length of the main belt;

the automatic loading/unloading apparatus may have a slidably mounted rigid bed provided under the working run of the main belt and arranged to stiffen the working run, the rigid bed being arranged to be slidably mounted and to be servo-controlled to the shuttle in such a manner as to follow the variation in the length of the stacking zone;

the loading/unloading apparatus may have at least one paddle mounted to move between at least one high reception position in which it is above the tray-receiving zone, an upstream low reception position provided under the high reception position and in which it is designed to be received in the storage tray behind the flat article that is furthest from the stacking zone, a stacking position offset downstream from the low reception position and in which it is designed to retain the upstream end of the stack of flat articles that are to be unstacked/that have been unstacked;

the paddle is coupled to settling means arranged to move the paddle from its upstream low reception position towards a downstream low reception position so as to tamp the flat articles contained in the storage tray in the stacking direction and with a predetermined pressure value; and the paddle is coupled to steering means that are suitable for modifying the inclination of the paddle between a vertical position in which it is substantially perpendicular to the stacking direction and suitable for being inserted in the storage tray, and an inclined position in which its low portion is downstream from its high portion relative to the stacking direction so that it can retain a stack of flat articles.

The invention also provides a sorting machine for sorting flat articles, the sorting machine including at least one unstacker, conveyor means, and sorting outlets into which the flat articles are to be distributed in compliance with a predetermined sorting plan, said sorting machine being characterized in that it includes at least one automatic loading/unloading apparatus as described above and provided respectively upstream from said unstacker and downstream from at least one of said sorting outlets.

The invention also provides a method of automatically unloading flat articles stacked on edge into/from storage trays, each of which has a bottom plate receiving the edges of the flat articles and provided with at least one through window, said method being characterized in that it comprises at least:

a feed step during which at least one storage tray containing flat articles stacked on edge is placed in a tray-receiving zone at which it is supported by at least one actuator that is a stationary actuator or a moving actuator, and the window is in register respectively with the moving actuator or with the stationary actuator;

an extraction step during which the moving and stationary actuators are moved relative to each other in a first direction so that respectively the moving actuator or the stationary actuator passes through the window so that the edges of the flat articles bear against the end of the moving actuator or of the stationary actuator and move gradually away from the bottom plate until they are above the outer panels of the storage tray and come flush with a stacking zone suitable for receiving the flat articles after unloading;

a transfer step during which said flat articles are moved in said stacking direction, from the end of the moving actuator or of the stationary actuator towards the stacking zone at which said flat articles as unloaded in the form of stack are accumulated; and a release step for releasing the storage tray and during which the moving and stationary actuators are moved relative to each other in a second direction opposite from the first direction so that the window is released from the passing respectively of the moving actuator or of the stationary actuator, and so that the storage tray can be removed from the tray-receiving zone.

The automatic unloading method of the invention may advantageously have the following features:

prior to the extraction step, an adjustment step is performed during which the length of the stacking zone is adjusted in the stacking direction as a function of the length of the stack of flat articles that it is carrying, and an approach step during which the storage tray is moved in the stacking direction downstream so that it is tangential to the stacking zone regardless of the length of the stacking zone;

the adjustment step and the approach step are performed simultaneously; and prior to said extraction step, a settling step is performed during which the stack of flat articles contained in the storage tray is compressed downstream and in the stacking direction, the resistance exerted against the compression is monitored, and, when the resistance reaches a predetermined threshold, the pressure is released to a level less than the predetermined threshold so as to allow a possible re-enlargement of the compressed stack, and then the pressure is maintained at a predetermined pressure value below the threshold in order to avoid damaging the flat articles as they are being extracted.

The invention also provides a postal sorting method during which at least one of the following steps is performed: unloading flat articles stacked on edge from a storage tray; unstacking the flat articles, sorting the flat articles, stacking the flat articles, and loading the flat articles into at least one storage tray; said postal sorting method being characterized in that the unloading steps are performed as described above by using a storage tray of a predetermined type having its bottom wall provided with at least one through window, and in that, during the loading, a storage tray of the same predetermined type is used so as to use only one type of storage tray during said postal sorting method.

BRIEF DESCRIPTION OF THE DRAWINGS

The present invention can be better understood and other advantages appear on reading the following detailed description of two embodiments given by way of non-limiting example and with reference to the accompanying drawings, in which.

DESCRIPTION OF THE EMBODIMENTS

In FIGS. 3 to 17, the flat articles in a stack are represented diagrammatically by a rectangular outline containing irregular hatching that stops short of the outline.

The automatic loading/unloading apparatus 1, 101 and the automatic unloading method of the invention are designed for automatically loading flat articles 200 stacked on edge into a storage tray 300, and for automatically unloading flat articles 200 stacked on edge from a storage tray 300. The automatic loading/unloading apparatus 1, 101 is described below as automatic unloading apparatus. Naturally, the same automatic unloading apparatus 1, 101 may be used as automatic loading apparatus, by performing the steps in reverse order.

Figure 1:
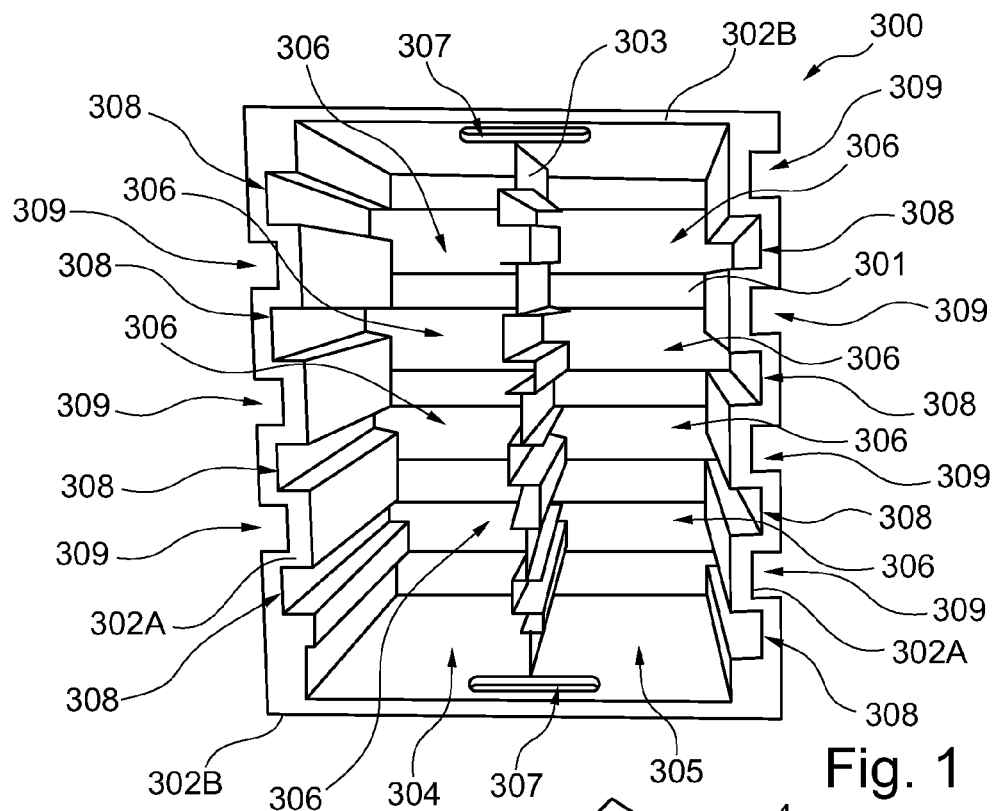
FIG. 1 is a perspective view from above, showing a storage tray that is usable with the automatic loading/unloading apparatus of the invention.

FIG. 1 shows a storage tray 300 that is usable with the automatic unloading apparatus 1, 101 of the invention and with the automatic unloading method of the invention. Such a storage tray 300 has a bottom plate 301 and panels 302 including outer panels 302A, 302B that are substantially parallel in pairs, and a partition 303 that is substantially parallel to two of the outer panels 302A and that, together with the bottom plate 301, defines first and second compartments 304, 305 that are adjacent to each other. These first and second compartments 304, 305 have openings that are opposite from the bottom wall 301, and via which the flat articles (not shown in FIG. 1) can be loaded into the first and second compartments 304, 305 and unloaded therefrom. In the example shown, the first and second compartments 304, 305 are of substantially the same dimensions, but they may also be of different dimensions. When the flat articles are stored in either or both of the first and second compartments 304, 305 of the storage tray 300, their edges rest on the bottom plate 301 and the flanks of the stack(s) that they define bear against the partition 303 and against the outer panels 302A.

The facing outer panels 302B may be provided with oblong orifices 307 (visible in FIG. 1) serving as handles for taking hold of the storage tray 300. The bottom plate 301 is also provided with two rows of through windows 306, one row being provided in each first and second compartment 304, 305. The windows 306 are in the form of slots that are substantially perpendicular to the partition 303 and that are Z-shaped in overall shape, having first and second branches defining the ends of the window 306. In the example shown, all of the windows 306 are substantially mutually identical in terms of shape and of dimensions. They are disposed at regular intervals, they are substantially mutually parallel and they extend in the same direction. In addition, they are substantially perpendicular to the partition 303 and to the facing outer panels 302A. The flat articles are designed to be disposed so that their edges are substantially parallel to the partition 303 and thus substantially perpendicular to the windows 306. The windows 306 of each first and second compartment 304, 305 extend between the partition 303 and the corresponding outer panel 302A into which they are extended. To this end, in register with each end of a window 306, the outer panels 302A and the partition 303 are provided with a plurality of grooves 308, the shape and the dimensions of which correspond to the shape and dimensions of the ends of the windows 306 in register with which they are respectively placed. Each window 306 is thus flanked by two grooves 308. The windows 306 are designed to allow, individually, an actuator (not shown in FIG. 1) to pass through the bottom plate 301, which actuator is mounted to slide in and to penetrate into the grooves 308. In an embodiment that is not shown, the storage tray may comprise a single compartment. The storage tray 300 is also provided with additional grooves 309 carried by the outside faces of the outer panels 302A, 302B. These additional grooves 309 are substantially parallel to the grooves 308, e.g. they are disposed in alternation relative thereto. These additional grooves 309 are suitable for co-operating with settling elements (shown in detail below with reference to FIG. 2), outside the storage tray 300. The co-operation between the additional grooves 309 and the settling elements makes it possible to position the storage tray 1 reliably relative to the shuttle described below. Similarly, the bottom plate may be provided with through slots in different number and/or of different shapes and/or dimensions, and/or at different intervals and/or extending in different directions.

Figure 3:
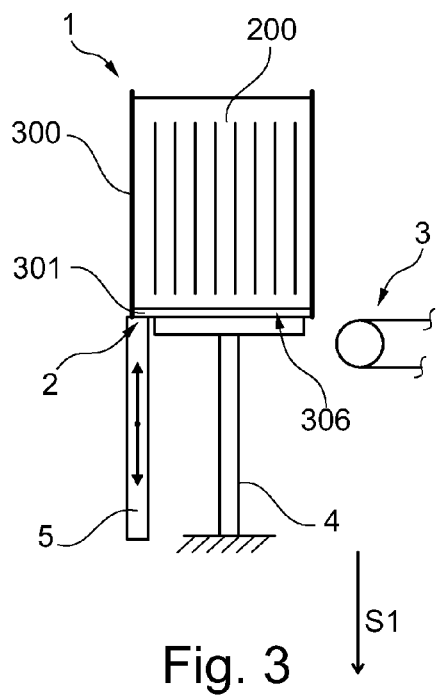
FIGS. 3 & 4 and 5 & 6 are diagrammatic side views of two different operating principles for the automatic loading/unloading apparatus of the invention.
Figure 4:
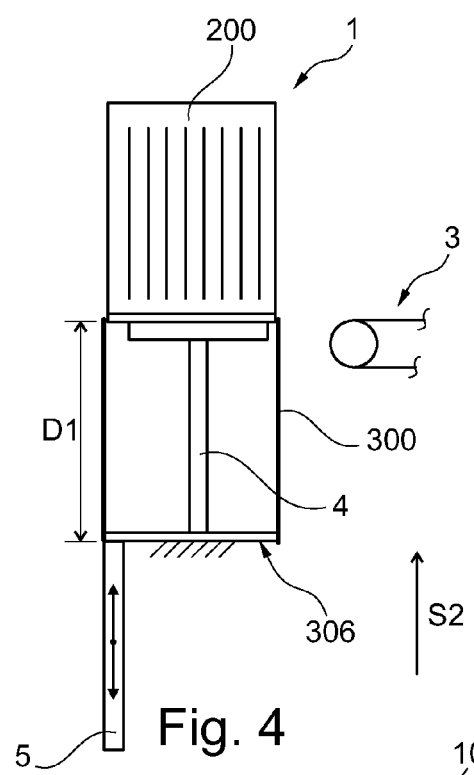
Figure 5:
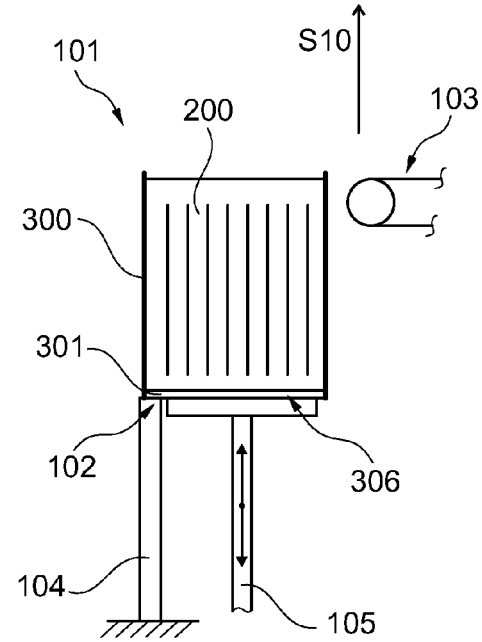
Figure 6:
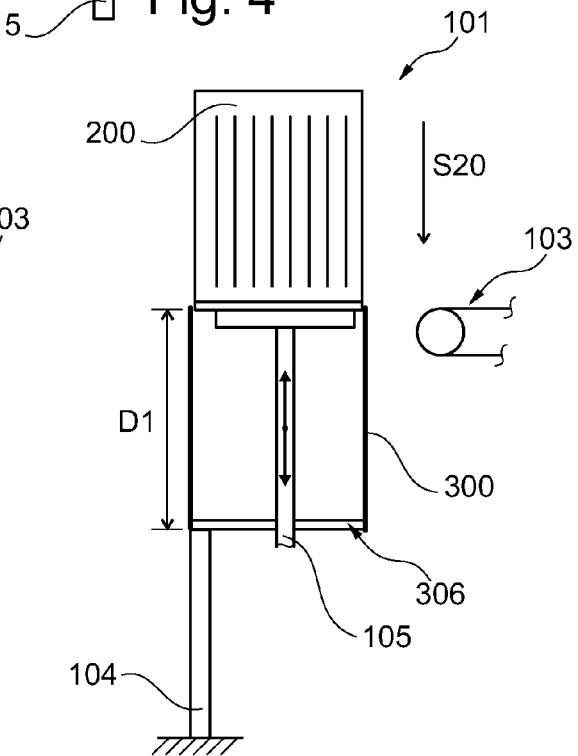

The automatic unloading apparatus 1, 101 of the invention can operate on two different principles shown by FIGS. 3 and 4 for the first principle and by FIGS. 5 and 6 for the second principle. For reasons of simplification and in non-limiting manner, these principles are described in detail below on the basis of a storage tray 300 having a bottom wall 301 through which a single window 306 passes that co-operates with a single stationary actuator and with a single moving actuator. Regardless of the operating principles, the automatic unloading apparatus 1, 101 of the invention has a tray-receiving zone 2, 102 suitable for receiving a storage tray 300 containing flat articles 200 stacked on edge to be emptied, and a stacking zone 3, 103 suitable for receiving the flat articles 200 as a stack on edge after unloading. The storage zone is advantageously provided with settling elements (not shown) suitable for co-operating with the additional grooves 309 to position the storage tray more reliably in the tray-receiving zone 2. The automatic unloading apparatus 1, 101 also has a stationary actuator 4, 104 and a moving actuator 5, 105, one of which is designed to receive the storage tray 300 bearing against it, the other actuator being designed to be in register with the window 306 in the storage tray 300. The freedom of the moving actuator 5, 105 to move is represented by a doubled-headed arrow.

On the first operating principle of the automatic unloading apparatus 1 shown by FIGS. 3 and 4, the storage tray 300 is bearing against the moving actuator 5, the stationary actuator 4 is in register with the window 306, and the tray-receiving zone 2 is substantially at the same height as the stacking zone 3. When the moving actuator 5 is in the waiting position (FIG. 3), the storage tray 300 is in a high position in which the bottom wall 301 is substantially at the same height as the stacking zone 3. Thus, the edges of the flat articles 200 stacked in the storage tray 300 and in contact with the bottom wall 301 are substantially at the same height as the stacking zone 3. The free end of the stationary actuator 4 is under the window 306 below the bottom plate 301, without being in contact with the flat articles 200. In order to go from the waiting position to the unloading position, the moving actuator 5 is moved vertically in a first direction indicated by the arrow S1. The moving actuator 5 is thus lowered, thereby causing the storage tray 300 that it is carrying to be lowered. In the resulting unloading position (FIG. 4), the storage tray 300 is in a low position in which it is retracted relative to the stacking zone 3. In order to enable the storage tray 200 to be retracted in this way between the stationary actuator 4 and the stacking zone 3, the distance D1 therebetween is at least equal to the height of the storage tray 300. The edges of the flat articles 200 remain bearing against the free end of the stationary actuator 4 that passes through the window 306. The flat articles 200 are thus still in the high position, their edges being substantially at the same height as the stacking zone 3. Since the storage tray 300 is below, it is not interposed between the flat articles 200 to be unloaded and the stacking zone 3. The flat articles 200 can thus be transferred merely by being moved in translation, without the storage tray 300 hindering this transfer. Once the flat articles 200 have been transferred from the free end of the stationary actuator 4, the storage tray 300 and the moving actuator 5 can be brought back up vertically in a second direction opposite from the first direction S1 and indicated by the arrow S2.

On the second operating principle of the automatic unloading apparatus 101 shown by FIGS. 5 and 6, the storage tray 300 is bearing against the stationary actuator 104, the moving actuator 105 is in register with the window 306, and the tray-receiving zone 102 is below the stacking zone 103, separated by a distance D1 at least equal to the height of the storage tray 300. When the moving actuator 105 is in the waiting position (FIG. 5), the storage tray 300 is in a low position in which it is retracted relative to the stacking zone 103, and the flat articles 200 are stacked on edge in the storage tray 300, bearing against the bottom wall 301. The free end of the moving actuator 105 is under the window 306 below the bottom plate 301, without being in contact with the flat articles 200. In order to go from the waiting position to the unloading position, the moving actuator 105 is moved vertically in a first direction indicated by the arrow S10. The moving actuator 5 is thus raised, thereby causing the flat articles 200 that it is carrying to be raised. In the resulting unloading position (FIG. 6), the storage tray 300 remains in its low position, the flat articles 200 are in a high position in which their edges bearing on the free end of the moving actuator 105 are substantially at the same height as the stacking zone 103 onto which they can then be transferred merely by being moved in translation, without the storage tray 300 hindering this transfer. Once the flat articles 200 have been transferred from the free end of the stationary actuator 105, the storage tray 300 and the moving actuator 5 can be brought back down vertically in a second direction opposite from the first direction S10 and indicated by the arrow S20.

The automatic unloading apparatus 1, 101 of the invention includes motor-drive means suitable for moving the moving actuator and a control unit suitable for causing the various elements making up the automatic unloading device 1, 101 to move sequentially.

Figure 16:
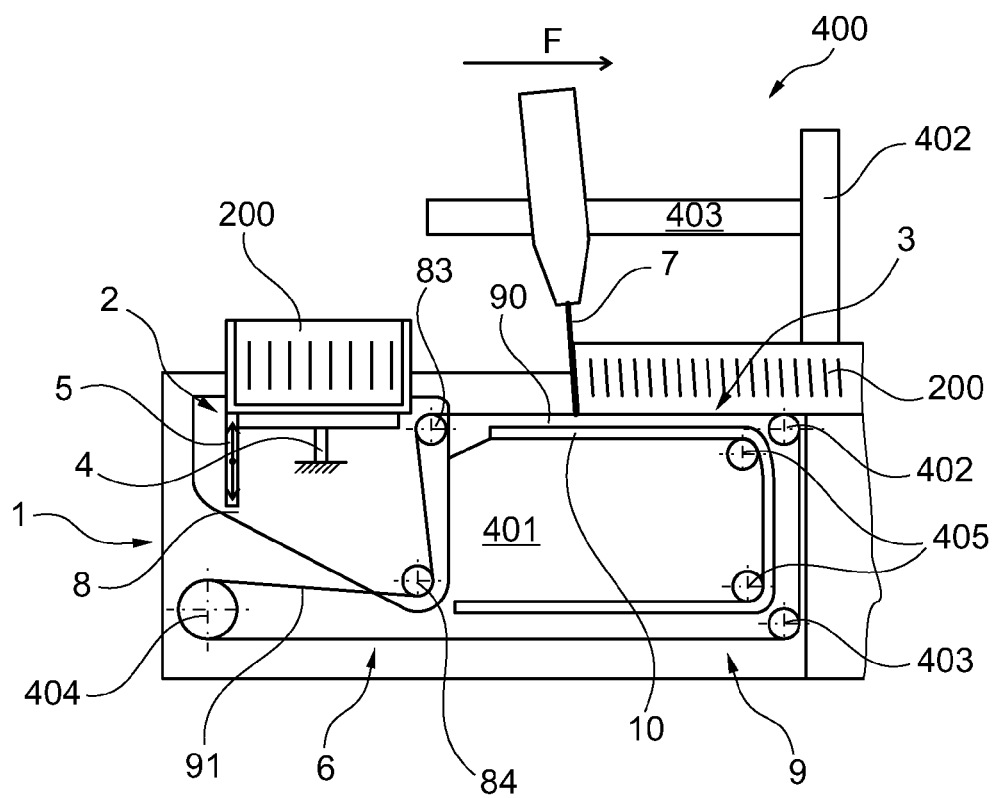
FIGS. 16 and 17 are diagrammatic side views of the automatic loading/unloading apparatus of the invention, showing, in particular, two different positions for the shuttle of FIG. 2.
Figure 17:
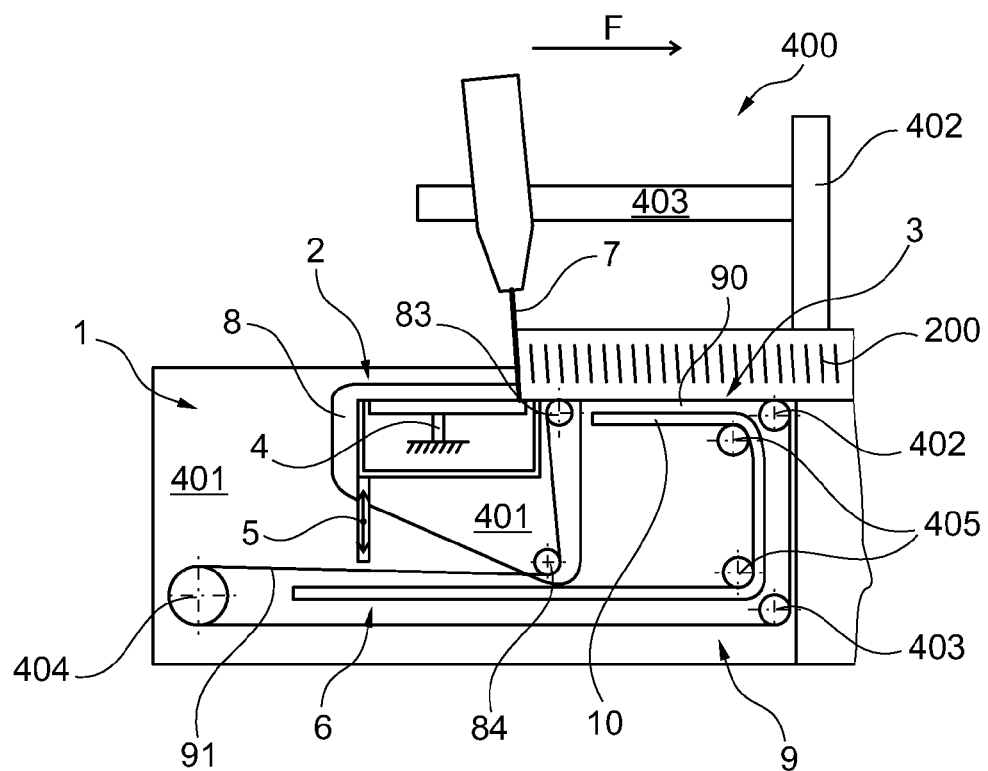

As shown in FIGS. 16 and 17, the automatic unloading apparatus 1 may be incorporated into a sorting machine 400 and may include adjustment means 6 for adjusting the length of the stacking zone 3. In this example, the automatic unloading apparatus 1 operates on the first operating principle that is described above. Naturally, it can operate on the second principle. In non-limiting manner, the sorting machine 400 includes a frame 401 provided with a gibbet-type bracket 402 having a horizontal arm 403 making it possible to guide a paddle 7 in translation in a stacking direction indicated by the arrow F.

Figure 2:
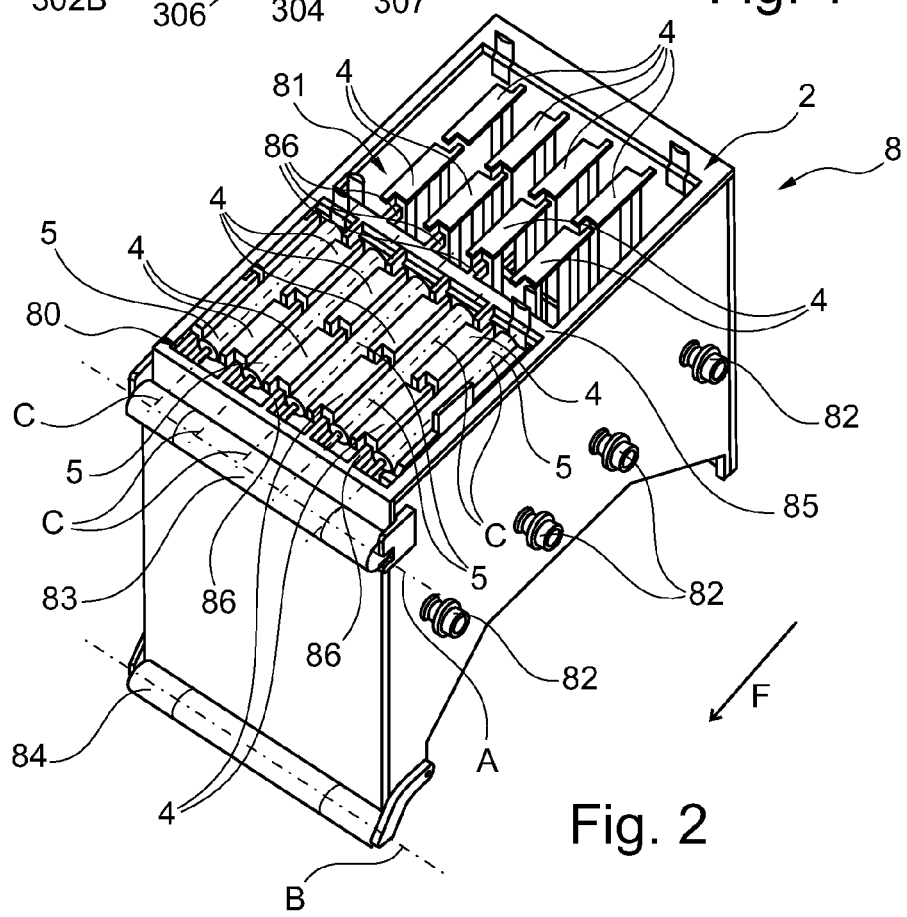
FIG. 2 is a perspective view of a shuttle of the automatic loading/unloading apparatus of the invention.

The automatic unloading apparatus 1 includes a shuttle 8 incorporating the stationary actuator 4 and the moving actuator 5 as described above. An example of a shuttle 8 is shown in FIG. 2. This shuttle 8 is in the form of a box, and, in the example shown, a double box made up of two chambers 80, 81 separated by an intermediate wall 85. Each of the chambers 80, 81 is suitable for receiving and housing a storage tray (not shown in FIG. 2). In each of its chambers 80, 81, the shuttle 8 is provided with two rows of fingers 4 defining the stationary actuators. These fingers 4 are suitable for passing through the windows 306 in the storage tray 300 of FIG. 1. For this purpose, the free ends of the fingers 4 are Z-shaped in overall shape, complementary to the shape of the windows 306. Since, in this example, the automatic unloading apparatus 1 is designed for a storage tray 300 having two compartments 304, 305, the fingers 4 are disposed in pairs of fingers 4, provided in register with each other, a pair containing one finger 4 for a window 306 of the first compartment 304 of the storage tray 300 and one finger 4 for the window 306 of the second compartment 305 that is in register with said window 306 of the first compartment 304. The fingers 4 extend from the bottom of the corresponding chamber 80, 81 to the tops of the outer walls of the shuttle 8. As shown in detail below, the free ends of the fingers 4 are designed to receive the edges of the flat articles 200. In addition, the shuttle 8 is provided with settling elements 86 carried by the opposite faces of the intermediate wall 85. In the example shown, these settling elements 86 are in the form of tongues of rectangular section provided at the top of the intermediate wall 85 and each disposed in register with the recess formed by the branch of the Z-shape of the adjacent finger 4. The settling elements 86 may also extend over the entire height of the intermediate wall 85. The settling elements 86 serve to guide the storage tray while it is moving vertically in the shuttle 8 by co-operating with the additional grooves 309 in the storage tray 300. The settling elements 86 make it possible, in particular to settle two storage trays 300 side-by-side. In addition, the shuttle 8 is provided with two rows of rollers 5 defining the stationary actuators. One row of rollers 5 is disposed in each chamber 80, 81. The rollers 5 are carried by pins having axes C that are substantially mutually parallel and parallel to the alignment of each pair of fingers 4. The rollers 5 are dimensioned so that each of them extends between two pairs of fingers 4, parallel to the free ends of the fingers 4. These rollers 5 are mounted to turn individually about their respective axes C. They are carried by a support (not shown) that is mounted to move relative to the fingers 4 and that is suitable for moving the rollers 5 in translation, simultaneously, between a waiting position in which they stand proud of the chambers 80, 81 between the fingers 4, and an unloading position in which they are set back from the free ends of the fingers 4 and housed at the bottoms of the chambers 80, 81. The top of the shuttle 8 forms the tray-receiving zone 2 for receiving the storage trays 300. Thus, when the rollers 5 are in their unloading position, the storage tray 300 may be stood, in its high position, on the rollers 5, the fingers 4 then being in register with the windows 306. By moving in rotation, the rollers 5 facilitate putting the storage tray 300 into position on the tray-receiving zone 2. As explained in detail below, when the rollers 5 go from their waiting position to their unloading position, the storage tray 300 is lowered gradually into the chamber 80, 81 towards its low position, and the free ends of the fingers 4 that are then in contact with the edges of the flat articles 200 keep them in the high position. The storage tray 300 is lowered until the tops of its outer panels 302A, 302B are set back below the free ends of the fingers 4 so that the flat articles 200 can be transferred towards the stacking zone 3.

The shuttle 8 is also designed to move in translation relative to the frame, in the substantially horizontal stacking direction F, between an upstream position and a downstream position, so that it can move the storage tray 300 present in the tray-receiving zone 2 closer to the upstream end of a stack of flat articles 200 present in the stacking zone 3. In this optimized closer configuration shown in FIG. 17, the tray-receiving zone 2 is in the immediate vicinity of the stack of flat articles 200 already present in the stacking zone 3. Thus, the flat articles 200 that are freshly unloaded from the storage tray 300 can be transferred easily and directly and accumulated at the back of the stack already present in the stacking zone 3. In order to enable the shuttle 8 to move in translation, the outer walls of the shuttle 8, which walls are parallel to the stacking direction F, are provided with guide studs 82 aligned in the stacking direction F and suitable for co-operating with a runner (not shown) provided in the frame 401. In addition, the outer wall of the shuttle 8 that is designed to face towards the stacking zone 3 is provided with a high intermediate pulley 83 and with a low intermediate pulley 84, the axes A, B of the pulleys being substantially mutually parallel and being designed to be perpendicular to the stacking direction F. The axes A and B are also aligned in a plane that is substantially perpendicular to the stacking direction F.

The automatic unloading apparatus 1 is provided with a high downstream pulley 402, with a low downstream pulley 403, and with an upstream pulley 404, all of these pulleys being carried by the frame 401. The shuttle 8 is disposed so that the high and low intermediate pulleys 83, 84 are situated between the high and low downstream pulleys 402, 403 and the upstream pulley 404. For example, the upstream pulley 404 may be a driven pulley, while the others of the idler pulley type. The automatic unloading apparatus 1 includes a main belt 9 of the endless type that is guided successively by the upstream pulley 404, by the low and high intermediate pulleys 84 and 83, by the high downstream pulley 402, and then by the low downstream pulley 403. The working run 90 of the belt 9 situated between the high intermediate pulley 83 and the high downstream pulley 402 defines the stacking zone 3. Since the low intermediate pulley 84 and the high intermediate pulley 83 are carried by the shuttle 8, the positions of their axes A, B vary with the position of the shuttle 8. As explained in detail below, the freedom of the shuttle 8 to move makes it possible to bring the tray-receiving zone 2 closer to the stacking zone 3. The shuttle 8 thus forms means for moving the unloading apparatus 1. The low intermediate pulley 84 and the high intermediate pulley 83, the high downstream pulley 402 and the upstream pulley are arranged so that the working run 90 and the opposite run 91 connecting the upstream pulley 404 to the low intermediate pulley 84 are substantially mutually parallel. In addition, the shuttle 8 is arranged so as to move substantially parallel to the working run 90 and to the opposite run 91. Thus, when the shuttle 8 is moved between its upstream and downstream positions, the working run 90 becomes shorter and the opposite run 91 becomes correspondingly longer, and vice versa when the shuttle 8 is moved from its downstream position to its upstream position. As a result, the length of the main belt 9 is substantially constant regardless of the position of the shuttle 8. The length of the stacking zone 3 is directly related to the length of the working run 90. Thus, the shuttle 8, the low intermediate pulley 84 and the high intermediate pulley 83, and the belt 9 form adjustment means for adjusting the stacking zone 3.

The unloading apparatus 1 also includes a slidably-mounted rigid bed 10, provided under the working run 90. For example, this rigid bed 10 may be of the roller blind type. It is guided by additional pulleys 405 and by side runners (not shown) making it possible to ensure that it is rigid, at least under the stacking zone 3. This rigid bed 10 is servo-controlled to the shuttle 8 so that the movement of the shuttle 8 causing the variation in the length of the stacking zone 3 also causes the length of the rigid bed 10 under the stacking zone 3 to vary. For this purpose, the end of the rigid bed provided under the working run 90 is, for example, secured to the shuttle 8. Thus, the length of the rigid bed 10 present under the working run 90 is directly related to the length of the stacking zone 3 and makes it possible to stiffen the working run 90.

As described in detail below, the paddle 7 is mounted to move in the stacking direction F between the following positions:
- a high reception position in which it is above the tray-receiving zone 2 so that it can be above a storage tray 300 present in the tray-receiving zone 2;
- an upstream low reception position provided to be lower than and in the same plane as the high reception position, and in which it is received in the storage tray 300 present in the tray-receiving zone 2 and upstream from the flat articles 200 present in the storage tray 300;
- a downstream low reception position provided at the same height as the low reception position and in which it presses forwards the flat articles 200 contained in the storage tray 300; and
- a stacking position provided downstream from the downstream low reception position and in which it is above the stacking zone 3.

In addition, the paddle 7 is coupled to settling means (not shown) making it possible, when the paddle 7 is in the low reception position, to cause the pressure applied to the stack of flat articles 200 stacked in the storage tray 300 to vary. In addition, in order to be inserted in the storage tray 300 containing the flat articles 200 stacked on edge, the paddle 7 has, for example, a shape that is complementary to the shape of the grooves 308 so that it can be received therein without any risk of the flat articles 200 being damaged. Finally, the paddle 7 is coupled to steering means (not shown) suitable for inclining it in the stacking direction F. The paddle 7 is thus inclinable between a vertical position in which it is substantially perpendicular to the stacking direction F so that it can be inserted into the storage tray 300 and an inclined position in which it is inclined relative to the stacking direction F so that its low portion is downstream from its high portion so as to retain the stack of flat articles 200 better.

FIG. 16 shows the unloading apparatus 1 with the moving actuator 5 (e.g. the rollers of FIG. 2) in its waiting position, the storage tray 300 resting on top of said actuator being in its high position. The paddle 7 is in its stacking position in which it is above the stacking zone and retains the back of a stack of flat articles 200 already present in the stacking zone 3. The shuttle 8 is in its downstream position. The stacking zone 3 and the rigid bed 10 are not in an optimized close configuration relative to the length of the stack of flat articles 200 present in the stacking zone 3, the working run 90 having a maximum length.

FIG. 17 shows the unloading apparatus 1 with the moving actuator 5 in its unloading position, the storage tray 300 resting on top of said actuator then being in its low position, retracted into the shuttle 8. In this figure showing an intermediate configuration, some of the flat articles 200 previously present in the storage tray are still carried by the ends of the stationary actuator 4 (e.g. the fingers of FIG. 2) and, are being transferred to the stacking zone 3 by means of the paddle 7 as moved to its stacking position. The shuttle 8 is in its upstream position in which the tray-receiving zone 2 and the stacking zone 3 are in the optimized close position with the length of the stacking zone adapted to the length of the stack of flat articles 200 that it is carrying, and the downstream edge of the storage tray 300 flush with the upstream end of the stacking zone 3, and thus of the pre-existing stack of flat articles 200 in the stacking zone 3.

The postal sorting machine 400 of the invention and including the automatic unloading apparatus 1 may also include automatic supply means (not shown) for supplying storage trays 300 to the tray-receiving means 2 and means for removing the same storage trays 300 from the tray-receiving zone 2 after they have been unloaded. In an embodiment that is not shown, the tray-receiving zone may accept a plurality of storage trays simultaneously.

The steps of the automatic unloading method of the invention are explained below, with reference to FIGS. 7 to 15, on the basis of automatic unloading apparatus 1 that is substantially similar to the apparatus of FIGS. 3, 4, 16, and 17, and that operates on the above-described first operating principle. In these figures, the stacking zone is represented by a plate and the rigid bed is not shown.

Figure 7:
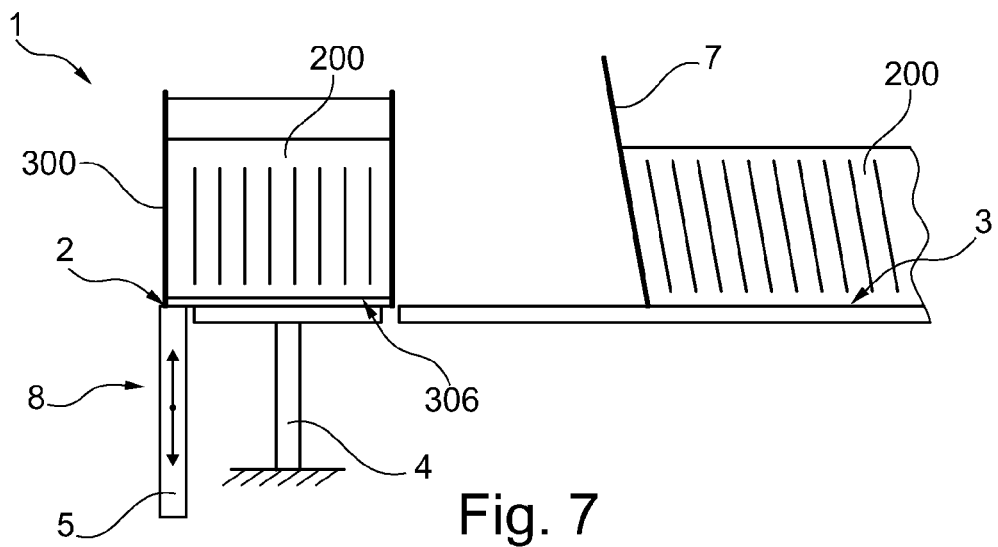
FIGS. 7 to 15 are diagrammatic side views of the steps of the automatic unloading method of the invention.

With reference to FIG. 7, the moving actuator 5 is in its high position in which its free end is substantially in register with the stacking zone 3, the shuttle 8 is in its upstream position in which it is remote from the stack of flat articles 200 previously placed in the stacking zone 3, the paddle 7 is in its stacking position and in its inclined position, in which positions it retains the back of the stack of flat articles 200 previously placed in the stacking zone 3, its low portion being downstream from its high portion. During a feed step, a storage tray 300 is placed on the tray-receiving zone 2, which tray contains flat articles 200 stacked on edge so that the edges of the flat articles 200 are substantially perpendicular to the stacking direction F and so that the window 306 is substantially aligned with the stacking direction F. To this end, the above-described settling elements are used (not shown in this figure) for settling the storage tray 300 in the tray-receiving zone 2. Once placed on the tray-receiving zone 2, the storage tray 300 is bearing against the moving actuator 5 and the free end of the stationary actuator 4 is in register with the window 306.

Figure 8:
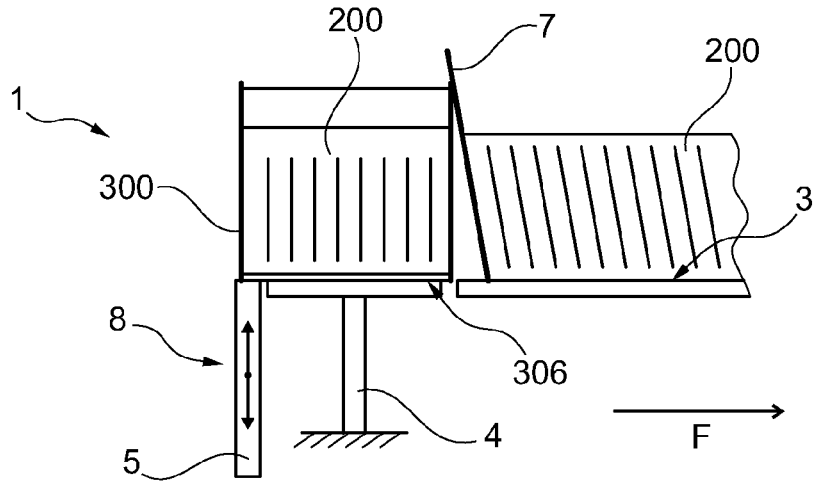

With reference to FIG. 8, an adjustment step and an approach step are performed simultaneously, during which steps the shuttle 8 is moved from its upstream position towards its downstream position and the length of the stacking zone 3 is adjusted to as short as possible so that the storage tray 300 is adjacent to the upstream end of the stack of flat articles 200 present in the stacking zone 3. In this configuration, the moving actuator 5 is in its high position and the paddle 7 is in its stacking and inclined positions.

Figure 9:
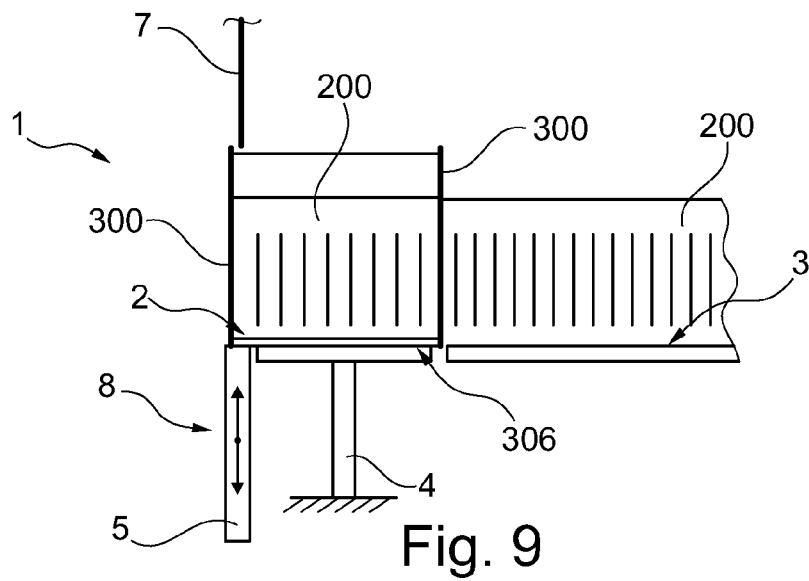

With reference to FIG. 9, the paddle 7 is moved in the stacking direction F, from its inclined position to its vertical position and from its stacking position to its high reception position in which it is above the grooves (reference 308 in FIG. 1) of the storage tray 300 placed in the tray-receiving zone 2. These two movements may be performed simultaneously or in succession. In the resulting configuration, the moving actuator 5 is in its high position and the shuttle 8 is in its downstream position.

Figure 10:
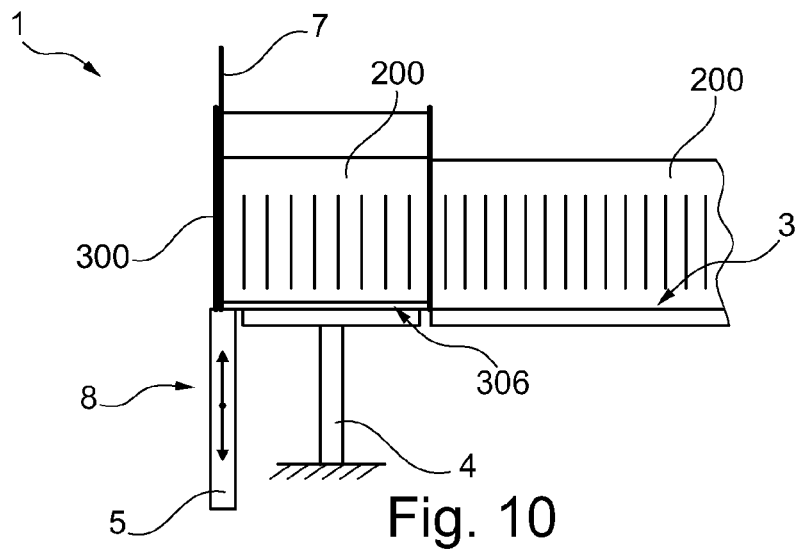

With reference to FIG. 10, the paddle 7 is kept in its vertical position and it is moved from its high reception position to its upstream low reception position in which it is inside the storage tray 300, received in the grooves (grooves 308 in FIG. 1) of the comb, upstream from the flat articles 200 stacked in the storage tray 300. In this configuration, the moving actuator 5 is in its high position and the shuttle 8 is in its downstream position. The downstream wall of the storage tray 300 retains the upstream end of the stack of flat articles 200 present in the stacking zone.

Figure 11:
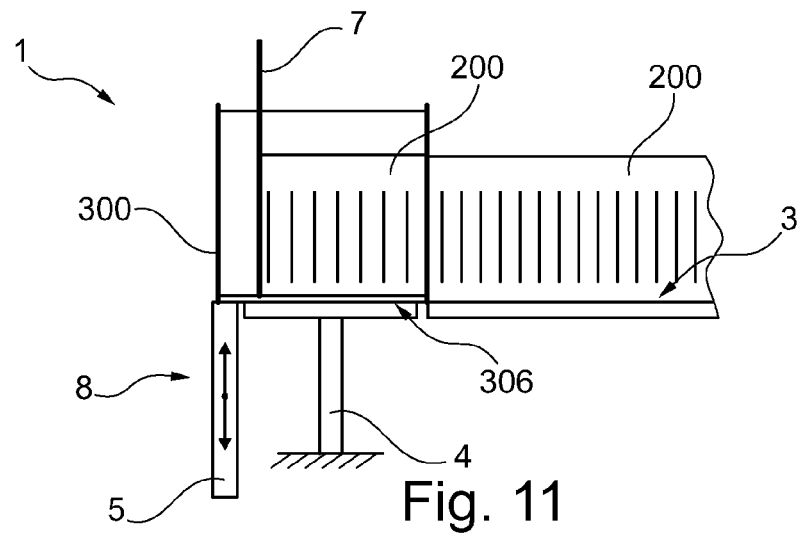

With reference to FIG. 11, a settling step is then performed during which the paddle 7 is moved, while keeping it in its vertical position, from its upstream low reception position downstream so as to shift it from the upstream groove so as to compress the stack of flat articles 200 against the downstream wall of the storage tray 300. During this settling step, the resistance exerted by the flat articles 200 is monitored, and, when said resistance reaches a predetermined threshold, the pressure is released to a level of pressure less than the predetermined threshold. Thus, the paddle 7 possibly moves back in a rearward movement corresponding to a re-enlargement of the stack of flat articles 200 until it reaches a low reception position in which the stack of flat articles 200 in the storage tray 300 is subjected to a controlled pressure. This controlled pressure is maintained under the predetermined threshold. In this configuration, the moving actuator 5 is in its high position and the shuttle 8 is in its downstream position. The downstream wall of the storage tray 300 retains the upstream end of the stack of flat articles 200 present in the stacking zone 3.

Figure 12:
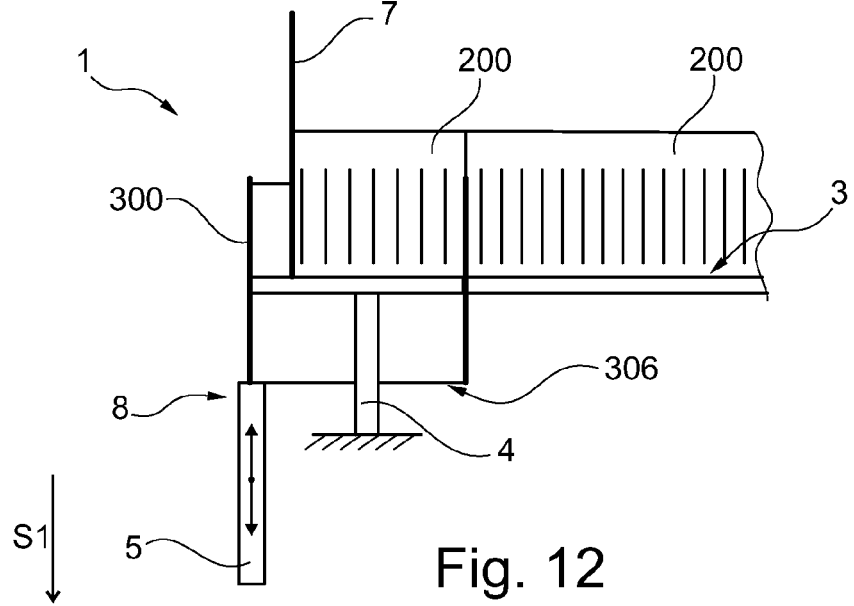
Figure 13:
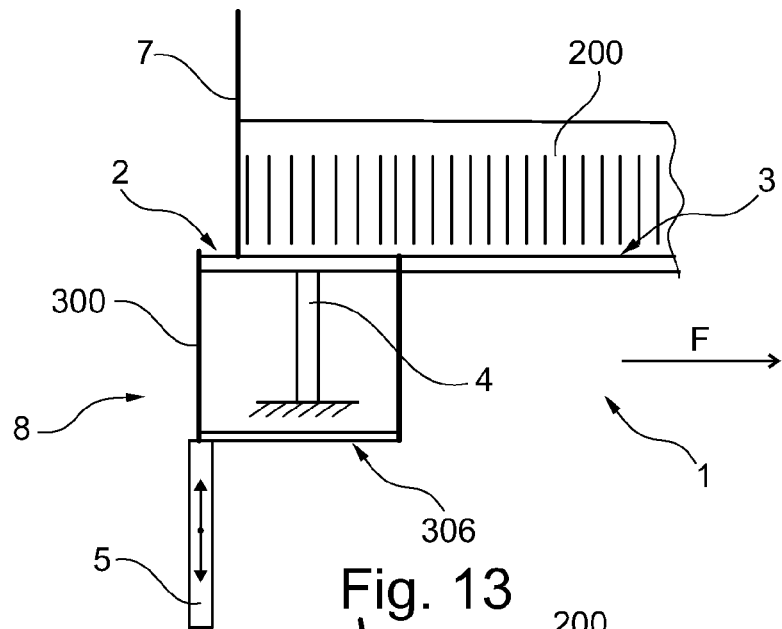

With reference to FIG. 12, an extraction step is performed during which the moving actuator 5 is moved relative to the stationary actuator 4 in a first direction S1, from its high position to its low position. The storage tray 300 carried by the moving actuator 5 thus goes from its high position to its low position. The edges of the flat articles 200 come into contact with the free end of the stationary actuator 4. The flat articles 200, carried by the stationary actuator 4, thus remain in the high position, their edges substantially in register with the stacking zone 3 from which they are separated by the downstream wall of the storage tray 200. During the movement of the moving actuator 5 and of the storage tray 300, the upstream end of the stack of flat articles 200 retained on the stationary actuator 4 is retained by the paddle 7 in its vertical and downstream low reception positions. In addition, the storage tray 300 is guided in its movement by the settling elements (not shown in FIG. 12). As the movement is taking place, the stack of flat articles 200 contained in the storage tray 300 is gradually in direct alignment with the stack of flat articles 200 already present in the storage zone 3. The moving actuator 5 and the storage tray 300 thus move down until the downstream wall of the storage tray 300 is no longer interposed between the flat articles 200 previously contained in the storage tray 300, and the stack of flat articles 200 present in the storage zone 3. The stack of flat articles 200 carried by the stationary actuator 4 and by the stacking zone 3 then form a single whole. This configuration is shown in FIG. 13, in which the edges of the flat articles 200 are above the storage tray 300, the moving actuator 5 and the storage tray 300 are in their low positions, and the shuttle 8 is in its downstream position.

Figure 14:
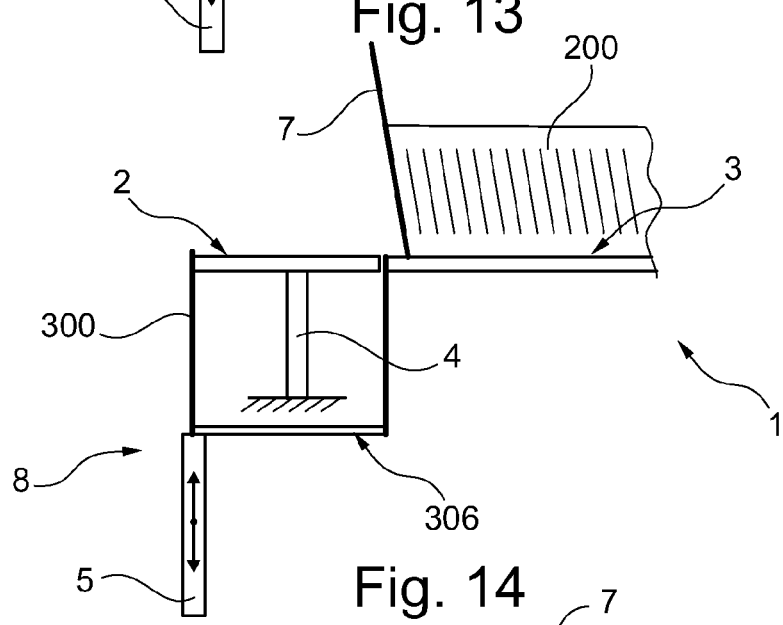

With reference to FIG. 14, a transfer step is then performed during which the paddle 7 is inclined from its vertical position to its inclined position and the shuttle 8 is moved, in the direction opposite from the stacking direction F, from its downstream position to its upstream position and, simultaneously, using the reclaimed space, said stacking zone 3 is lengthened under the stacked flat articles 200 freshly unloaded from the storage tray 300. Thus, the entire stack of flat articles 200 is resting on the stacking zone 3. In this configuration, the shuttle 8 is in its upstream position, the moving actuator 5 is in its low position, the paddle 7 is in its inclined and downstream positions, the storage tray 300 is empty and the flat articles 200 that it contained are stacked with the other flat articles 200 in the stacking zone 3.

Figure 15:
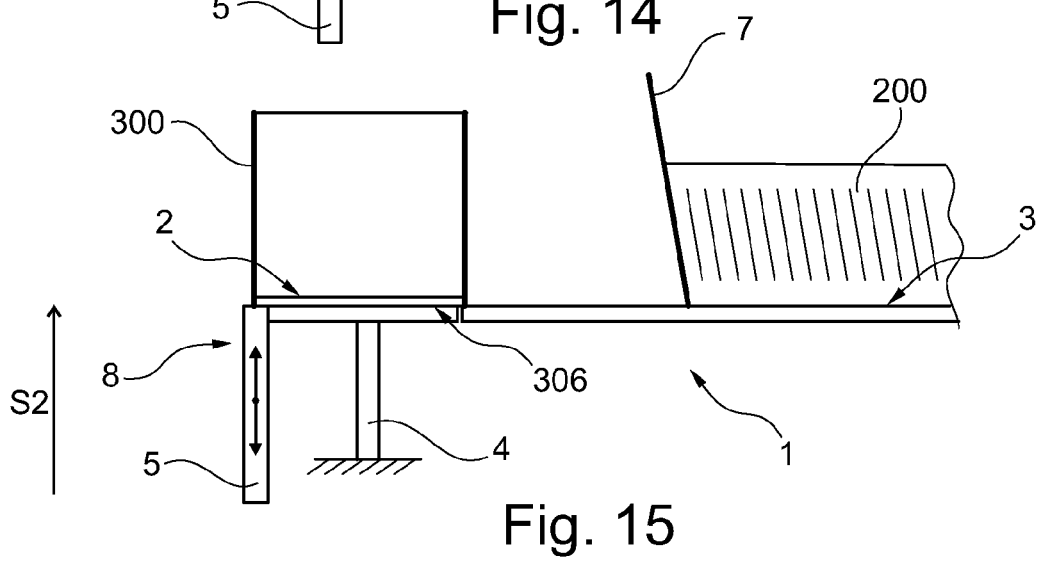

With reference to FIG. 15, a step of releasing the storage tray 300 is then performed during which the moving actuator 5 carrying the storage tray 200 is moved in a second direction S2 opposite from the first direction S1 from its low position to its high position. During this movement, the storage tray 300 is guided by the settling elements (not shown in FIG. 15). When the storage tray 300 is in its high position, the moving actuator 5 no longer passes through the window, and the storage tray 300 is then free to be removed from the tray-receiving zone 2. The unloading cycle may be started again with another storage tray 300 containing other flat articles 200 stacked on edge. The flat articles 200 stacked in the stacking zone 3 are gradually removed by the sorting machine 400. The paddle 7 is servo-controlled to the sorting machine so as to be capable of following the variation in this stack.

The automatic loading/unloading apparatus, the sorting machine, the method of automatically unloading flat articles and the postal sorting method of the invention thus make it possible to automate the operations of unloading and of loading flat articles stacked on edge by using a single type of tray.

The invention claimed is:

1. An automatic loading/unloading apparatus (1, 101) for automatically loading flat articles (200) stacked on edge into storage trays (300) and for automatically unloading flat articles (200) stacked on edge therefrom, each of said storage trays (300) having a bottom plate (301) receiving the edges of the flat articles (200) and provided with at least one through window (306), said automatic loading/unloading apparatus (1, 101) having at least one tray-receiving zone (2, 102) suitable for receiving said storage trays (300) successively and at least one stacking zone (3; 103) suitable for receiving said flat articles (200) stacked on edge in the stacking direction (F) before loading/after unloading, said automatic loading/unloading apparatus having at least one stationary actuator (4; 104) and at least one moving actuator (5, 105), which actuators are designed so that, simultaneously, one of them is in register with said window (306) and the other of them receives said storage tray (300) bearing against it, and so that said actuators are movable relative to each other between:

a waiting position in which said stationary actuator (4) or said moving actuator (105) that is in register with said window (306) is set back from said moving actuator (5) or from said stationary actuator (104) so that said storage tray (300) can rest respectively on said moving actuator (5) or on said stationary actuator (104) without respectively said stationary actuator (4) or said moving actuator (105) being in contact with said flat articles (200); and an unloading position in which respectively said moving actuator (5) or said stationary actuator (104) is set back from said stationary actuator (4) or from said moving actuator (105) so that said stationary actuator (4) or said moving actuator (105) can pass through said window (306) while carrying said flat articles (200) to be loaded/ unloaded until it comes flush with said stacking zone (3; 103) without said storage tray (300) being interposed between said flat articles (200) and said stacking zone (3; 103), said automatic loading/unloading apparatus (1, 101) being characterized in that it has adjustment means (8, 83, 84, 9) arranged to adapt the length of said stacking zone (3; 103), in said stacking direction (F), between a maximum length and a minimum length corresponding to the length of the stack of flat articles (200) that it receives.

2. The automatic loading/unloading apparatus (1, 101) according to claim 1, characterized in that it has at least one shuttle (8) carrying said stationary actuator (4; 104) and said moving actuator (5; 105) and defining said tray-receiving zone (2; 102), said shuttle (8) being mounted to move in said stacking direction (F), so that said tray-receiving zone (2; 102) remains adjacent to said stacking zone (3; 103) regardless of the length of said stacking zone (3; 103), said shuttle (8) thus being mounted to move between an upstream position corresponding to said stacking zone (3; 103) having a maximum length and a downstream position corresponding to said stacking zone (3; 103) having a minimum length.

3. The automatic loading/unloading apparatus (1; 101) according to claim 2, characterized in that it has at least one main belt (9) of the endless type, guided by pulleys including at least one high intermediate pulley (83) and at least one low intermediate pulley (84) that are carried by said shuttle (8), and a high downstream pulley (402), a low downstream pulley (403), and an upstream pulley (404) that are carried in stationary manner and that are provided on either side of said shuttle (8), the working run (90) of said belt (9) extending between said high intermediate pulley (83) and said high downstream pulley (402) and defining said stacking zone (3; 103), and in that said shuttle (8) moving in translation simultaneously causes the length of said stacking zone (3; 103) to vary, and causes said tray-receiving zone (2; 102) to be kept adjacent to said stacking zone (3; 103).

4. The automatic loading/unloading apparatus (1) according to claim 3, characterized in that, between said upstream pulley (404) and said low intermediate pulley (84), said main belt (9) defines an opposite run (91) that is substantially parallel to said working run (90) so that the variation in the length of the stacking zone (3; 103) while said shuttle (8) is moving does not have any impact on the total length of said main belt (9).

5. The automatic loading/unloading apparatus (1; 101) according to claim 3, characterized in that it has a slidably mounted rigid bed (10) provided under said working run (90) of said main belt (9) and arranged to stiffen said working run (90), said rigid bed (10) being arranged to be slidably mounted and to be servo-controlled to said shuttle (8) in such a manner as to follow the variation in the length of said stacking zone (3; 103).

6. The automatic loading/unloading apparatus (1; 101) according to claim 1, characterized in that it has at least one paddle (7) mounted to move between at least one high reception position in which it is above said tray-receiving zone (2; 102), an upstream low reception position provided under said high reception position and in which it is designed to be received in said storage tray (200) behind the flat article that is furthest from said stacking zone (3; 103), a stacking position offset downstream from said low reception position and in which it is designed to retain the upstream end of said stack of flat articles (200) that are to be unstacked/that have been unstacked.

7. The automatic loading/unloading apparatus (1; 101) according to claim 6, characterized in that said paddle (7) is coupled to settling means arranged to move said paddle (7)

from its upstream low reception position towards a downstream low reception position so as to tamp said flat articles (200) contained in the storage tray (300) in said stacking direction (F) and with a predetermined pressure value.

8. The automatic loading/unloading apparatus (1; 101) according to claim 6, characterized in that said paddle (7) is coupled to steering means that are suitable for modifying the inclination of said paddle (7) between a vertical position in which it is substantially perpendicular to said stacking direction (F) and suitable for being inserted in said storage tray (300), and an inclined position in which its low portion is downstream from its high portion relative to said stacking direction (F) so that it can retain a stack of flat articles (200).

9. A sorting machine (400) for sorting flat articles (200), the sorting machine including at least one unstacker, conveyor means, and sorting outlets into which said flat articles are to be distributed in compliance with a predetermined sorting plan, said sorting machine being characterized in that it includes at least one automatic loading/unloading apparatus (1; 101) according to claim 1 and provided respectively upstream from said unstacker and downstream from at least one of said sorting outlets.

10. A method of automatically unloading flat articles (200) stacked on edge into/from storage trays (300), each of which has a bottom plate (301) receiving the edges of said flat articles (200) and provided with at least one through window (306), said method being characterized in that it comprises at least:
- a feed step during which at least one storage tray (300) containing flat articles (200) stacked on edge is placed in a tray-receiving zone (2; 102) at which it is supported by at least one actuator that is a stationary actuator (4; 104) or a moving actuator (5; 105), and said window (306) is in register respectively with said moving actuator (5; 105) or with said stationary actuator (4; 104);
- an extraction step during which said moving and stationary actuators (5; 105; 4; 104) are moved relative to each other in a first direction (S1) so that respectively said moving actuator (5; 105) or said stationary actuator (4; 104) passes through said window (306) so that the edges of said flat articles bear against the end of said moving actuator (5; 105) or of said stationary actuator (4; 104) and move gradually away from the bottom plate (301) until they are above the outer panels (302A, 302B) of said storage tray (300) and come flush with a stacking zone (3; 103) suitable for receiving said flat articles (200) after unloading;
- a transfer step during which said flat articles (200) are moved in said stacking direction (F), from the end of said moving actuator (5; 105) or of said stationary actuator (4; 104) towards said stacking zone (3; 103) at which said flat articles (200) as unloaded in the form of stack are accumulated; and
- a release step for releasing said storage tray (300) and during which said moving and stationary actuators (5; 105; 4; 104) are moved relative to each other in a second direction (S2) opposite from said first direction (S1) so that said window (306) is released from the passing respectively of said moving actuator (5; 105) or of said stationary actuator (4; 104), and so that said storage tray (300) can be removed from said tray-receiving zone (2; 102).

11. An automatic unloading method according to claim 10, characterized in that, prior to said extraction step, an adjustment step is performed during which the length of said stacking zone (3) is adjusted in said stacking direction (F) as a function of the length of the stack of flat articles (200) that it is carrying, and an approach step during which said storage tray (300) is moved in said stacking direction (F) downstream so that it is tangential to said stacking zone (3) regardless of the length of said stacking zone (3).

12. An automatic unloading method according to claim 10, characterized in that said adjustment step and said approach step are performed simultaneously.

13. An automatic unloading method according to claim 10, characterized in that, prior to said extraction step, a settling step is performed during which the stack of flat articles (200) contained in said storage tray (300) is compressed downstream and in said stacking direction (F), in that the resistance exerted against said compression is monitored, and in that, when said resistance reaches a predetermined threshold, said pressure is released to a level less than said predetermined threshold so as to allow a possible re-enlargement of said compressed stack, and then said pressure is maintained at a predetermined pressure value below said threshold.

14. A postal sorting method during which at least one of the following steps is performed: unloading flat articles stacked on edge from a storage tray; unstacking said flat articles, sorting said flat articles, stacking said flat articles, and loading said flat articles into at least one storage tray; said postal sorting method being characterized in that said unloading steps are performed as in said unloading method of claim 10 by using a storage tray (300) of a predetermined type having its bottom wall (301) provided with at least one through window (306), and in that, during said loading, a storage tray (300) of the same predetermined type is used so as to use only one type of storage tray (300) during said postal sorting method.

* * * * *